United States Patent [19]

Handelman et al.

[11] Patent Number: 5,666,412
[45] Date of Patent: Sep. 9, 1997

[54] SECURE ACCESS SYSTEMS AND METHODS UTILIZING TWO ACCESS CARDS

[75] Inventors: Doron Handelman, Givataim; Moshe Kranc; David Fink, both of Jerusalem; Arnold Zucker, Ramat Modiim; Perry Smith, Jerusalem; Gerson Bar-On, Kohav Hashahar, all of Israel

[73] Assignee: News Datacom Ltd., London, England

[21] Appl. No.: 375,995

[22] Filed: Jan. 20, 1995

[30] Foreign Application Priority Data

Oct. 3, 1994 [IL] Israel .......................... 111151

[51] Int. Cl.$^6$ .............. H04L 9/00; H04N 7/167; G06F 7/04

[52] U.S. Cl. .................. 380/4; 380/16; 380/20; 380/21; 380/25; 395/186; 340/825.31; 235/382

[58] Field of Search ................ 380/16, 20, 21, 380/25, 4; 348/1, 3, 5.5; 340/825.31; 395/186, 187.01, 188.01, 490, 491; 235/382, 382.5

[56] References Cited

U.S. PATENT DOCUMENTS

| | | | |
|---|---|---|---|
| 3,996,450 | 12/1976 | KerKhoff | 235/61.7 B |
| 4,325,078 | 4/1982 | Seaton et al. | 380/16 |
| 4,594,663 | 6/1986 | Nagata et al. | 264/401 R |
| 4,613,901 | 9/1986 | Gilhousen et al. | 380/20 |
| 4,709,136 | 11/1987 | Watanabe | 235/379 |
| 4,768,229 | 8/1988 | Benjamin et al. | 380/20 |
| 4,870,261 | 9/1989 | Mancini et al. | 235/382 |
| 4,908,834 | 3/1990 | Wiedemer | 380/5 |
| 5,010,571 | 4/1991 | Katznelson | 380/4 |
| 5,060,079 | 10/1991 | Rufus-Isaacs | 348/1 |
| 5,065,429 | 11/1991 | Lang | 380/25 |
| 5,111,504 | 5/1992 | Esserman et al. | 380/21 |
| 5,243,175 | 9/1993 | Kato | 235/435 |
| 5,319,705 | 6/1994 | Halter et al. | 380/4 |
| 5,337,358 | 8/1994 | Axelrod et al. | 380/23 |
| 5,428,685 | 6/1995 | Kadooka et al. | 380/25 |
| 5,481,609 | 1/1996 | Cohen et al. | 380/16 |
| 5,526,428 | 6/1996 | Arnold | 380/25 |
| 5,534,857 | 7/1996 | Laing et al. | 340/825.34 |
| 5,559,885 | 9/1996 | Drexler et la. | 380/23 |

*Primary Examiner*—Thomas H. Tarcza
*Assistant Examiner*—Pinchus M. Laufer
*Attorney, Agent, or Firm*—Limbach & Limbach L.L.P.

[57] ABSTRACT

A CATV system including a CATV network and apparatus for transmitting over the CATV network information to a multiplicity of subscriber units, each including a CATV decoder and an IC card reader and writer coupled to the CATV decoder, the IC card reader and writer includes two separate IC card receptacles, such that IC cards inserted into the two separate IC card receptacles are separately accessed by the IC card reader and writer.

34 Claims, 8 Drawing Sheets

SECURE ACCESS SYSTEMS AND METHODS UTILIZING TWO ACCESS CARDS

The present invention relates to secure access systems generally and more particularly to secure access systems which employ integrated circuit cards.

BACKGROUND OF THE INVENTION

Access systems generally provide access to restricted means, such as communication systems and data, or to restricted areas such as buildings and departments. There are known in the art access systems which employ integrated circuit (IC) cards, or as more commonly referred to "smart cards", to provide secure access to restricted means or areas.

Smart cards are employed in systems such as pay TV systems and telephone systems. Such systems generally employ one card per unit which is to be accessed, whereby access is enabled whenever a valid smart card is inserted in a card slot.

U.S. Pat. No. 4,709,136 to Watanabe describes an IC card reader/writer apparatus which includes at least two contactors in which IC cards are inserted, respectively, card detecting means for detecting that at least two IC cards have been loaded, and collating means verifying that correct cipher codes of the two IC cards coincide with those inputted externally, respectively, wherein access to the contents stored in the IC cards is allowed only when the collation results in coincidence.

U.S. Pat. No. 4,594,663 to Nagata et al describes a credit transaction processing system which processes data related to a commodity entered into by using a card owned by a customer and a recording card owned by a store.

U.S. Pat. No. 5,010,571 to Katznelson describes a system for controlling and accounting for retrieval of data from a CD-ROM memory containing encrypted data files from which retrieval must be authorized.

SUMMARY OF THE INVENTION

The present invention seeks to provide access systems having improved security and flexible applications.

The term "access systems" is used throughout the specification and claims in a broad sense to include systems which allow controlled access to communication apparatus, software programs, restricted areas, such as buildings, terrain and departments in a plant, television and cable television transmissions, video programs, audio programs, computer data and electronic mail and voice information.

The term "CATV systems" is used throughout the specification and claims in a broad sense to include any form of pay TV systems which are either one-way systems or two-way systems utilizing cable communication networks, satellite communication networks/telephone communication networks or any combination thereof.

There is thus provided in accordance with a preferred embodiment of the present invention a CATV system including:
- a CATV network; and
- apparatus for transmitting over the CATV network information to a multiplicity of subscriber units, each including:
  - a CATV decoder; and
  - an IC card reader and writer, coupled to the CATV decoder, and including two separate IC card receptacles, wherein IC cards inserted into the two separate IC card receptacles are separately accessed by the IC card reader and writer.

There is also provided in accordance with a preferred embodiment of the present invention for use in a CATV system, wherein CATV programs are transmitted via a CATV network in encrypted form to a multiplicity of subscriber units each including a CATV decoder, and at least part of the CATV programs are rated for viewing under parental control, a CATV parental control system including:
- a first IC card including at least one of decryption seeds, decryption keys and algorithms for decryption of programs which are not rated for viewing under parental control;
- a second IC card including at least one of decryption seeds, decryption keys and algorithms for decryption of programs which are rated for viewing under parental control;
- an IC card reader and writer coupled to the CATV decoder;
- first and second IC card receptacles coupled to the IC card reader and writer, wherein the first and second IC cards communicate with the IC card reader and writer when inserted in the respective IC card receptacles; and
- a decrypter decrypting the programs which are not rated for viewing under parental control in response to receiving the at least one of decryption seeds, decryption keys and algorithms for decryption from the first IC card, and decrypting the programs which are rated for viewing under parental control in response to receiving the at least one of decryption seeds, decryption keys and algorithms for decryption from the first IC card and the at least one of decryption seeds, decryption keys and algorithms for decryption from the second IC card.

Additionally, there is also provided in accordance with a preferred embodiment of the present invention a parental control method for use in a CATV system, wherein CATV programs are transmitted via a CATV network in encrypted form to a multiplicity of subscriber units each including a CATV decoder, and at least part of the CATV programs are rated for viewing under parental control, the method of exercising parental control including:
- providing an IC card reader and writer coupled to the CATV decoder;
- inserting a first IC card in a first IC card receptacle coupled to the CATV reader and writer;
- addressing the first IC card via the CATV reader and writer to provide at least one of authentication, verification, validation and program entitlements of the first IC card;
- enabling decryption of programs which do not require parental control in response to providing the at least one of authentication, verification, validation and program entitlements of the first IC card;
- inserting a second IC card in a second IC card receptacle coupled to the CATV reader and writer;
- verifying that the first IC card is in the first IC card receptacle;
- addressing the second IC card via the CATV reader and writer to provide at least one of authentication, verification, validation and program entitlements of the second IC card; and
- enabling decryption of programs which require parental control in response to providing the at least one of authentication, verification, validation and program entitlements of the first IC card and of the second IC card.

In accordance with another preferred embodiment of the present invention there is also provided a CATV access method, wherein CATV programs are transmitted via a CATV network to a multiplicity of subscriber units, each including a CATV decoder, the CATV access method including:

provising an IC card reader and writer, coupled to the CATV decoder, and to two separate IC card receptacles; and separately addressing IC cards inserted into the two separate IC card receptacles to provide data enabling access to CATV transmissions.

Preferably, the method of exercising parental control also includes:

storing in the first IC card billing data corresponding to viewing of programs which do not require parental control and of programs which require parental control.

Additionally, the method of exercising parental control also includes:

maintaining separate accounts for programs which require parental control and for programs which do not require parental control in the first IC card.

Preferably, the step of maintaining separate accounts comprises employing separate identification codes to distinguish between programs which require parental control and programs which do not require parental control.

Additionally, the first IC card also includes a memory for storing billing data corresponding to viewing of programs which do not require parental control and of programs which require parental control.

Yet additionally, the CATV parental control system also includes storage means for maintaining separate accounts for programs which require parental control and for programs which do not require parental control in the first IC card.

Further in accordance with a preferred embodiment of the present invention the CATV parental control system also includes a processor for providing separate identification codes to distinguish between programs which require parental control and programs which do not require parental control.

In accordance with a preferred embodiment of the present invention there is provided an IC card initialization system in a CATV system wherein access to CATV transmissions is provided by two IC cards, at least one of which being replaced at selected time periods, and wherein replaced cards are provided without valuable data stored therein, the IC card initialization system including a communicator communicating between a first IC card and a second IC card and providing data from a first IC card to a second IC card.

Preferably, the IC card reader and writer may access each of the two IC card receptacles interchangeably. Additionally, the first IC card and the second IC card are interchangeable.

There is also provided in accordance with a preferred embodiment of the invention an area access system including:

an identifier station including two separate card receptacles, wherein cards inserted into the two separate card receptacles are addressed by the identifier station;

an identification element including personal and official information; and an application element including at least one of access keys, access seeds, and algorithms for enabling access to the information in the identification element, wherein the identification element and the application element are addressed by the identifier station to enable access to a restricted area in accordance with the information and the at least one of access keys, access seeds, and algorithms for enabling access to the information.

Preferably, the information includes identification information of a bearer of the identification element. Additionally, the identification information includes a digitized picture of a bearer of the identification element. Yet additionally, the information includes information restricting access of a bearer of the identification element to a portion of the restricted area.

Preferably, part of the information is encrypted. Additionally, at least one of the identification element and the application element include security level data determining the level of security employed in encryption of the part of the information. Additionally, the area access system also includes a display for displaying the digitized picture of the bearer of the identification element.

In accordance with a preferred embodiment of the present invention there is also provided a method for accessing a restricted area including:

providing an identifier station including two separate card receptacles;

inserting an identification element including personal and official information in a first receptacle of the two separate card receptacles;

inserting an application element including at least one of access keys, access seeds, and algorithms for enabling access to the information in the identification element in a second receptacle of the two separate card receptacles;

addressing the identification element; and addressing the application element, wherein the identification element and the application element are addressed via the identifier station to enable access to a restricted area in accordance with the information and the at least one of access keys, access seeds, and algorithms for enabling access to the information.

In accordance with another preferred embodiment of the present invention there is provided a data access system including:

a processor;

a memory card reader and writer, coupled to the processor, and including a memory card receptacle, wherein a memory card carrying information to be accessed is inserted into the memory card receptacle and addressed by the memory card reader and writer; and an IC card reader and writer, coupled to the processor, and including an IC card receptacle, wherein an IC card, inserted into the IC card receptacle and addressed by the IC card reader and writer, provides access codes to enable access to the information carried in the memory card.

Further in accordance with a preferred embodiment of the invention there is also provided a data access system including:

a CATV network; and apparatus for transmitting over the CATV network CATV transmissions to a multiplicity of subscriber units, each including:

a CATV decoder;

a memory device reader and writer, coupled to the CATV decoder, and including a memory device receptacle, wherein a memory device carrying information to be accessed which is inserted by a subscriber into the memory device receptacle is addressed by the memory device reader and writer; and an IC card reader and writer, coupled to the CATV decoder and to the memory device reader and writer, and including an IC card receptacle, wherein an IC card, inserted by the subscriber into the IC card receptacle and addressed by the IC card reader and writer, provides access codes enabling access to the information carried in the memory device and to the CATV transmissions.

Preferably, the access codes comprise at least one of seeds, keys and algorithms for decryption of encrypted data. Additionally, at least part of the information is encrypted and at least one of the memory device, the IC card, the memory device reader and writer and the IC card reader and writer includes security level data determining the level of security employed in encryption of the at least part of the information.

Alternatively, at least part of the information is encrypted and the processor includes security level data determining the level of security employed in encryption of the at least part of the information. Yet alternatively, at least part of the information is encrypted and the CATV decoder includes security level data determining the level of security employed in encryption of the at least part of the information.

There is also provided in accordance with a preferred embodiment of the invention a method for accessing data stored in a memory device including:

providing a processor coupled to a memory device reader and writer and to an IC card reader and writer, wherein the memory device reader and writer includes a memory device receptacle and the IC card reader and writer includes an IC card receptacle;

inserting a memory device carrying data to be accessed into the memory device receptacle and addressing the memory device via the memory device reader and writer;

inserting an IC card into the IC card receptacle, and addressing the IC card via the IC card reader and writer;

communicating data between the IC card and at least one of the IC card reader and writer, the memory device reader and writer, the processor and the memory device to determine at least one of authentication, validation and verification of at least one of the memory device and the IC card; and accessing the data carried in the memory device when the at least one of authentication, validation and verification of at least one of the memory device and the IC card is successfully terminated.

Further in accordance with a preferred embodiment of the present invention there is provided a method for accessing data including:

providing a CATV network and apparatus for transmitting over the CATV network CATV transmissions to a multiplicity of subscriber units each including a CATV decoder coupled to a memory device reader and writer and to an IC card reader and writer, wherein the memory device reader and writer includes a memory device receptacle and the IC card reader and writer includes an IC card receptacle;

inserting a memory device carrying data to be accessed into the memory device receptacle and addressing the memory device via the memory device reader and writer;

inserting an IC card into the IC card receptacle, and addressing the IC card via the IC card reader and writer;

communicating data between the IC card and at least one of the IC card reader and writer, the memory device reader and writer, the CATV decoder and the memory device to determine at least one of authentication, validation and verification of at least one of the memory device, the IC card and the CATV decoder; and accessing the data carried in the memory device and the CATV transmissions when the at least one of authentication, validation and verification of at least one of the memory device, the IC card and the CATV decoder is successfully terminated.

In accordance with another preferred embodiment of the present invention there is provided a method for accessing data in a CATV network, wherein CATV transmissions are transmitted to a multiplicity of subscriber units, each including a CATV decoder and a television, the method for accessing data including:

inserting an IC card into an IC card receptacle forming part of an IC card reader and writer coupled to the CATV decoder;

addressing the IC card to enable access to video data stored in a memory embodied in the IC card by communicating any of seeds, keys and access control algorithms with the CATV decoder;

reading the data stored in the memory; and providing the data to the television.

There is also provided in accordance with a preferred embodiment of the present invention a CATV system including:

a CATV network; and apparatus for transmitting over the CATV network information to a multiplicity of subscriber units, each including:

a CATV decoder; and an IC card reader and writer, coupled to the CATV decoder, the IC card reader and writer including one IC card receptacle which accepts one IC card with two separate integrated circuits embodied within, wherein each of the separate integrated circuits is separately accessed by the IC card reader and writer.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
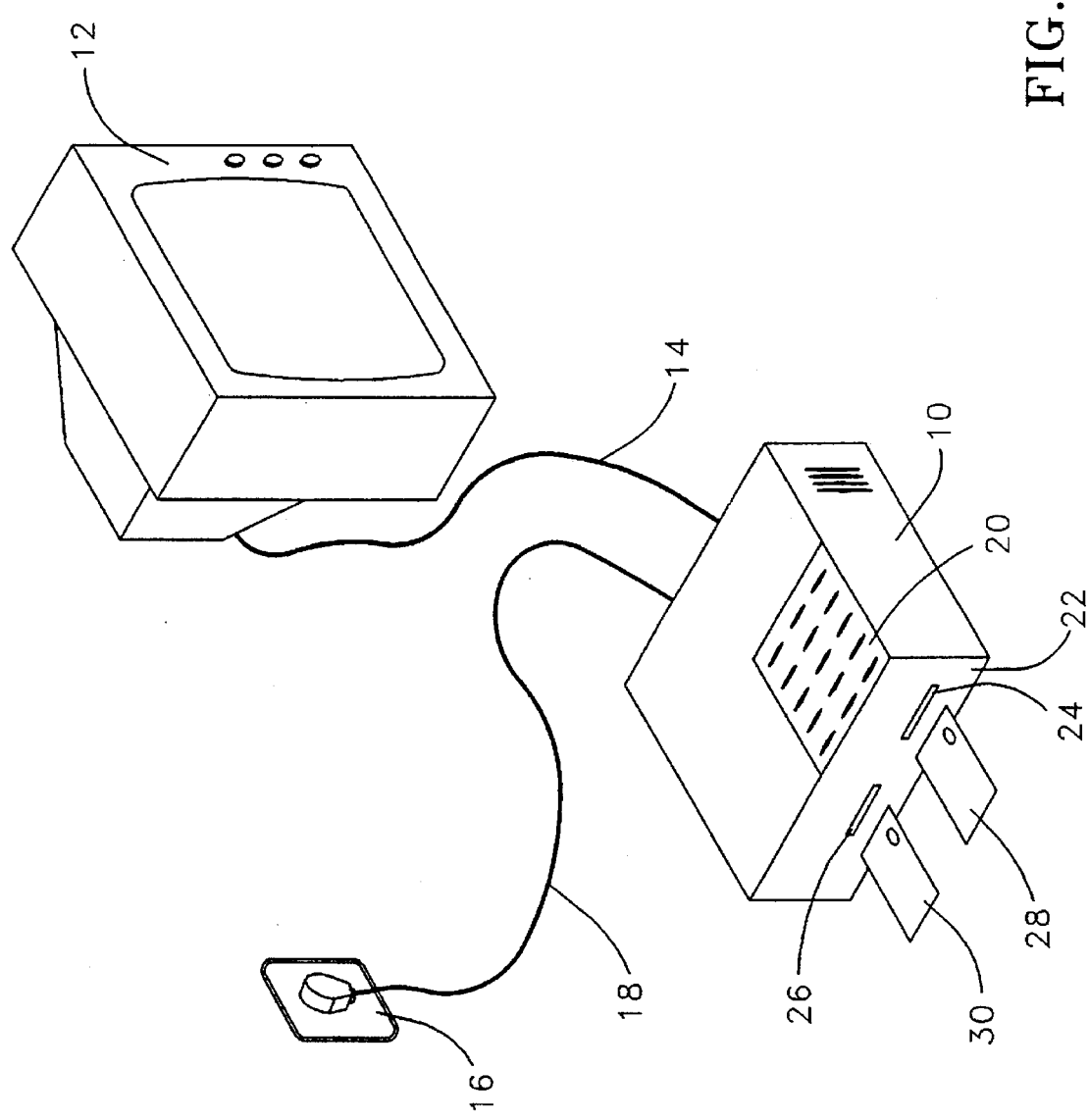
FIG. 1 is a generalized block diagram illustration of a parental control system in a CATV system constructed and operative in accordance with a preferred embodiment of the present invention.

Reference is now made to FIG. 1, which is a generalized illustration of a parental control system in a CATV system constructed and operative in accordance with a preferred embodiment of the present invention.

At a subscriber location a CATV decoder 10 is coupled to a television 12 via a coaxial cable 14. CATV decoder 10 is preferably fed from a CATV network (not shown) via a cable outlet 16 and a coaxial cable 18. CATV decoder 10 is preferably operated by a remote control (not shown) or a built-in keypad 20.

CATV decoder includes, at a front panel 22, two card receptacles 24 and 26. Preferably, card receptacles 24 and 26 may accept smart cards 28 and 30 respectively. Smart cards 28 and 30 are hereinafter referred to as the main card and the parent card respectively. CATV decoder 10 is operative to decrypt CATV programs which are transmitted from a remote location under control of the main card and the parent card which are operative to participate in any of an authentication procedure, a validation procedure and a verification procedure and to provide program entitlements.

Figure 2:
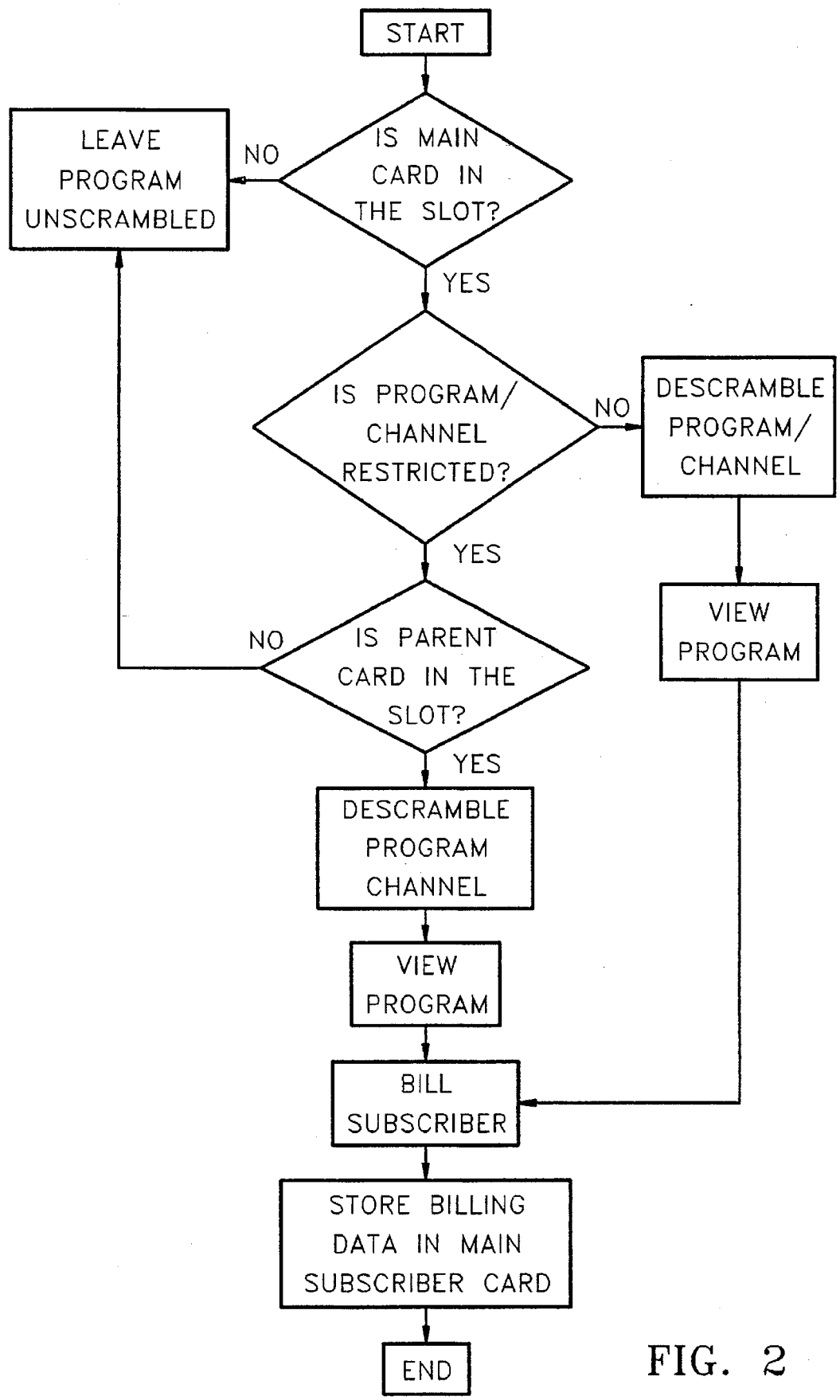
FIG. 2 is a flow chart illustration of the functionality of the parental control system of FIG. 1 in accordance with a preferred embodiment of the present invention.

Reference is now made to FIG. 2 which is a flow chart diagram of the operation of the parental control system of FIG. 1 in accordance with a preferred embodiment of the present invention.

When the main card is inserted in the card receptacle 24 of FIG. 1 and the parent card is not present in card receptacle 26 of FIG. 1, only programs which are not restricted for viewing under parental control are decrypted so that they can be intelligibly viewed on television 12.

If both the main card and the parent card are inserted in card receptacles 24 and 26 respectively, both programs which are restricted for viewing under parental control and programs which are not restricted for viewing under parental control are intelligibly displayed on television 12. Thus the parent card enables decryption of restricted programs in the presence of the main card. If the main card is removed from card receptacle 24 none of the transmitted programs is decrypted. However, if the parent card is removed from card receptacle 26 only programs which are restricted for viewing under parental control are not decrypted.

In a preferred embodiment of the invention billing data is also kept in the main card. In that case the main card retains billing data of programs which are not restricted for viewing under parental control as well as billing data of programs which are restricted for viewing under parental control. Additionally, separate accounts may be held for restricted programs and for non-restricted programs. Preferably, the separate accounts may be accessed by separate accounting identification codes.

In another preferred embodiment of the invention the parent card may retain initialization data and algorithms for initialization of an authentication procedure which is performed when the main card is changed. Most smart card based CATV systems require replacement of the smart cards, either periodically or upon suspect that the CATV system has been compromised. In that case, new smart cards are sent to the subscribers, generally by mail. However, since mailed smart cards are subject to possible theft, it is preferred that the mailed smart cards do not contain any entitlements or valuable data which may be stolen or compromised.

Preferably, the main card at a subscriber location may be frequently replaced while the parent card is seldom replaced. In that case all entitlements and billing data remaining in the main card since last report to a billing facility may be transmitted to the parent card prior to replacement of the main card. When the subscriber receives a new main card and places it in card receptacle 24, the parent card automatically starts an initialization algorithm which employs two way communication between the parent card and the new main card to provide authentication, verification, validation or a combination thereof of the main card. If the new main card is found to be valid the parent card transfers all entitlements for non-restricted programs and billing data, remaining in the old main card since last report to a billing facility, to the new main card. Thus, stealing of the new main card prior to performing the initialization algorithm provides no benefit to a thief.

It is to be appreciated that card receptacles 24 and 26 may be interchangeable so that each of the smart cards, i.e. the main card and the parent card, may be inserted in any of the card receptacles 24 and 26. In such a case a smart card reader/writer, incorporated within CATV decoder 10 of FIG. 1, determines which of the main card and the parent card are inserted in any of the card receptacles 24 and 26. CATV decoder 10 is then operative to decrypt non-restricted programs when the main smart card is inserted in any of the card receptacles 24 and 26, and restricted programs when both the main card and the parent card are inserted in both card receptacles 24 and 26.

Figure 3:
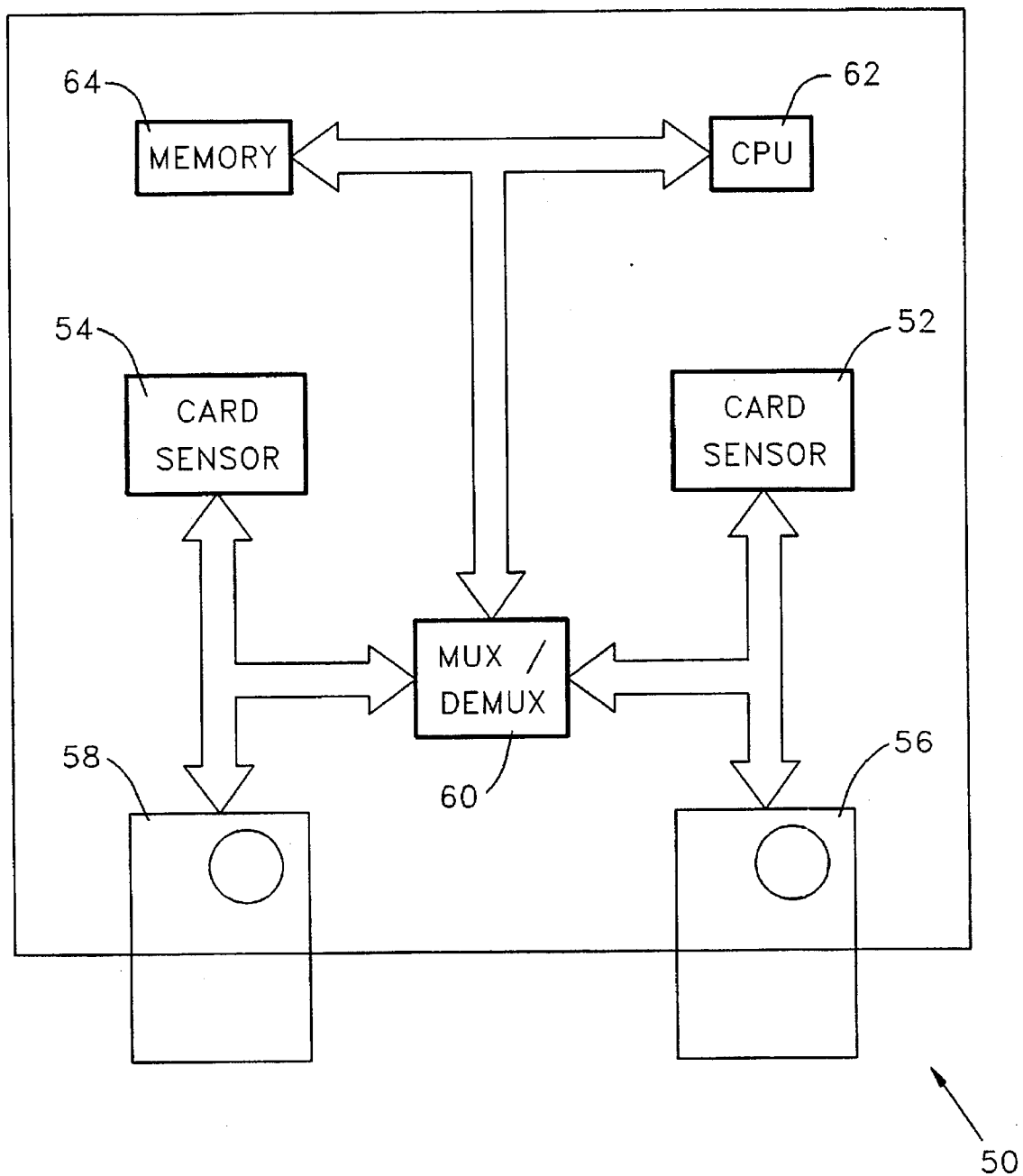
FIG. 3 is an illustration of a card reader/writer unit constructed and operative in accordance with a preferred embodiment of the present invention.

Reference now made to FIG. 3 which is an illustration of a card reader/writer unit constructed and operative in accordance with a preferred embodiment of the present invention.

The card reader/writer unit of FIG. 3, generally denoted by reference numeral 50, may be embodied in various access systems, such as a CATV system. In that case, card reader/writer unit 50 may be part of a CATV decoder, such as CATV decoder 10 (FIG. 1).

Card read/writer 50 includes two card sensors 52 and 54, a multiplexer/demultiplexer (MUX/DEMUX) 60, a CPU 62 and a memory 64. Card sensors 52 and 54 detect the existence of smart cards 56 and 58 in the respective card receptacles. Card sensors 52 and 54 also read data stored in the smart cards 56 and 58 and provide it to MUX/DEMUX 60. MUX/DEMUX 60 provides multiplexed data received from both smart cards 56 and 58 to a CPU 62 and a memory 64.

In a write sequence, CPU 62 and memory 64 provide data to be written on at least one of the smart cards 56 and 58 to MUX/DEMUX 60 which is operable to demultiplex the data and provide it to the respective card via the respective card sensors 52 and 54.

Figure 4:
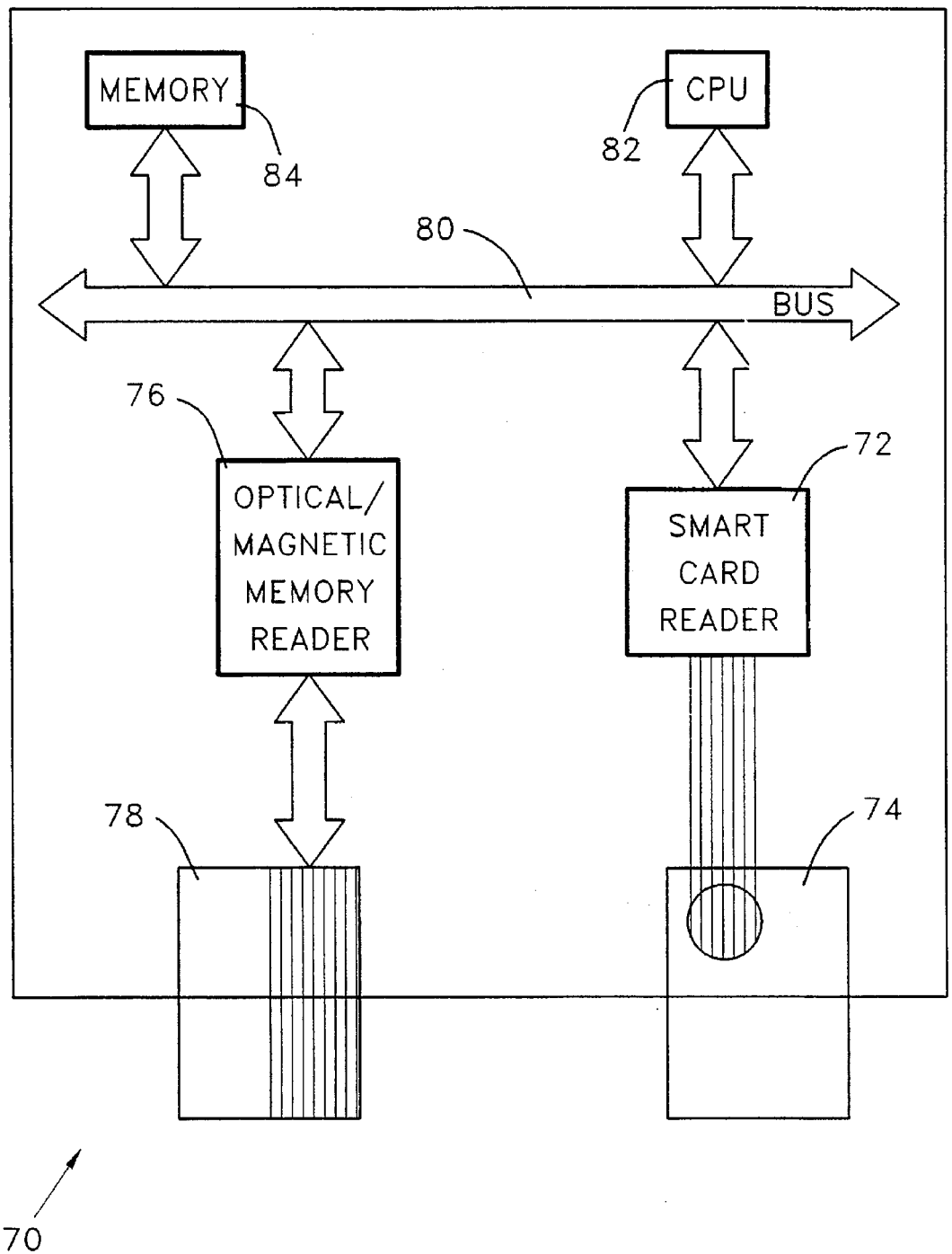
FIG. 4 is an illustration of a combined memory card and smart card reader/writer unit constructed and operative in accordance with a preferred embodiment of the present invention.

Reference is now made to FIG. 4 which is an illustration of a combined memory card and smart card reader/writer unit constructed and operative in accordance with a preferred embodiment of the present invention.

Combined memory card and smart card reader/writer unit, generally denoted by reference numeral 70, includes a smart card reader/writer 72 which is capable of reading/writing a smart card 74 and a memory card reader/writer 76 which is capable of reading/writing a memory card 78. It is to be appreciated that memory card 78 may be an optical memory card, a magnetic memory card or a magnetic disk.

Combined memory card and smart card reader/writer unit 70 also includes a communication BUS 80, a CPU 82 and a memory 84. Smart card reader/writer 72 and memory card reader/writer 76 are operable to provide two-way communication with CPU 82 and memory 84 and with smart card 74 and memory card 78 via the communication BUS 80.

Figure 5:
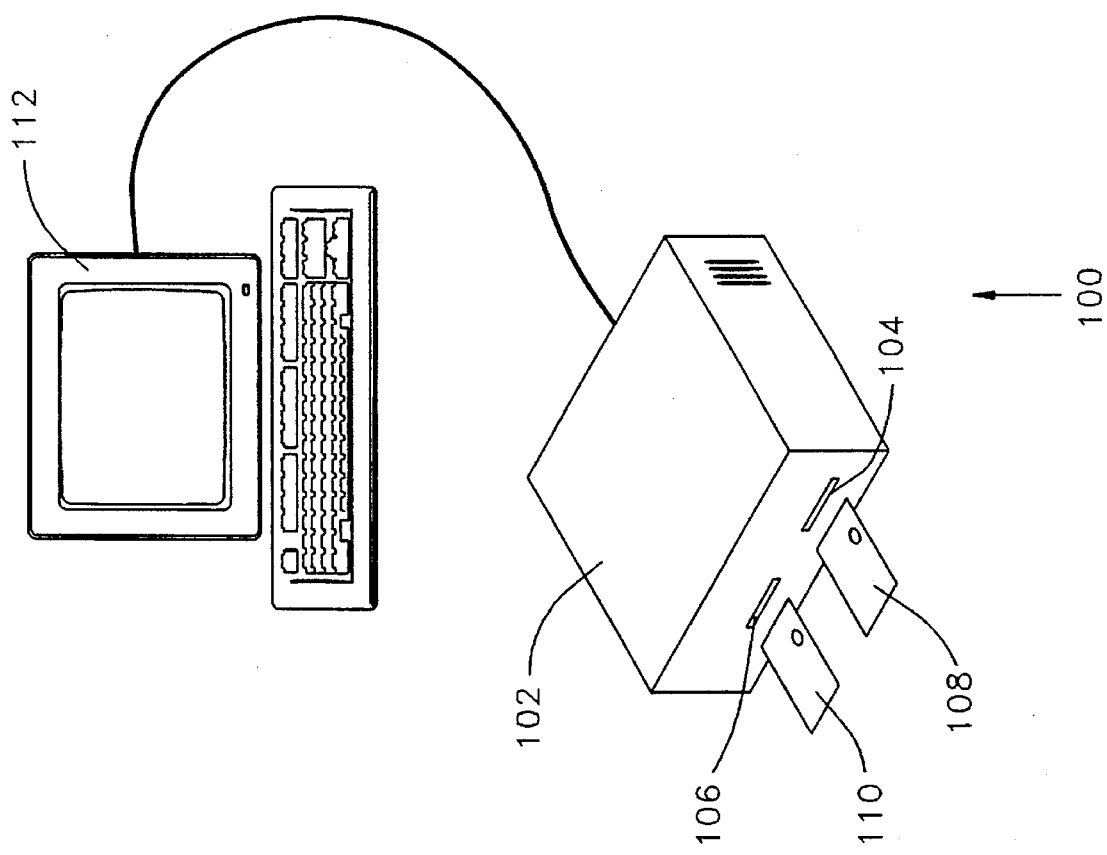
FIG. 5 is an illustration of an access system constructed and operative in accordance with a preferred embodiment of the invention.

Reference is now made to FIG. 5 which is an illustration of an access system constructed and operative in accordance with a preferred embodiment of the invention.

The access system of FIG. 5, generally denoted by reference numeral 100, may be employed to provide access to restricted areas such as buildings, stadiums and departments. It is especially suitable for use with racetrack facilities where access to horses, stables and riders' rooms are restricted to employees and key personnel only. Such applications require the features of personnel licensing and identification to be provided by the access system.

In accordance with a preferred embodiment of the invention the access system 100 includes an identifier station 102 with two card receptacles 104 and 106 incorporated within. Card receptacles 104 and 106 may accept a identification element 108 and an application element 110 respectively. License card 108 preferably includes personal and official information, as well as a digitized photograph to identify a card bearer, whereas application element 110 is the key to writing and reading all information stored in identification elements of the type of identification element 108. It is to be appreciated that when application element 110 is not present in card receptacle 106 fresh data cannot be stored in identification element 108 and existing information is inaccessible.

Part of the information in identification element 108 is clear and part is encrypted. The clear information may include the name and picture of the card bearer whereas the encrypted information may include the sites to which the card bearer is entitled to enter, racetrack commission name, restrictions relevant to racing and history events. The clear information may be read by any suitable smart card reader and the output is intelligible. The encrypted information may also be read by any smart card reader but the output is not intelligibly reproduced, unless read by identifier station 102 with both application element 110 and identification element 108 present in the corresponding card receptacles.

In accordance with a preferred embodiment of the invention various security levels may be employed in the system. Preferably, a selected security level is part of the input entered in one of application element 110 and identification element 108 or in both application element 110 and identification element 108. The security level may be a number between 0 and 3, where 0 denotes no encryption and 3 denotes the highest level of encryption. Thus, identification element 108 may include security level 0 and application element 110 may include a security level between 1 to 3. Alternatively, both application element 110 and identification element 108 may be encrypted.

Preferably, access system 100 reads the information stored in application element 110 and identification element 108 and provides at least part of it to a computer 112 which displays the information on a display, which may be the computer display. Alternatively, the information may be displayed on an internal display which is incorporated within access system 100. Preferably, the computer display and the internal display are suitable to display with high quality, the picture of the card bearer which is stored in the identification element 108.

Figure 6:
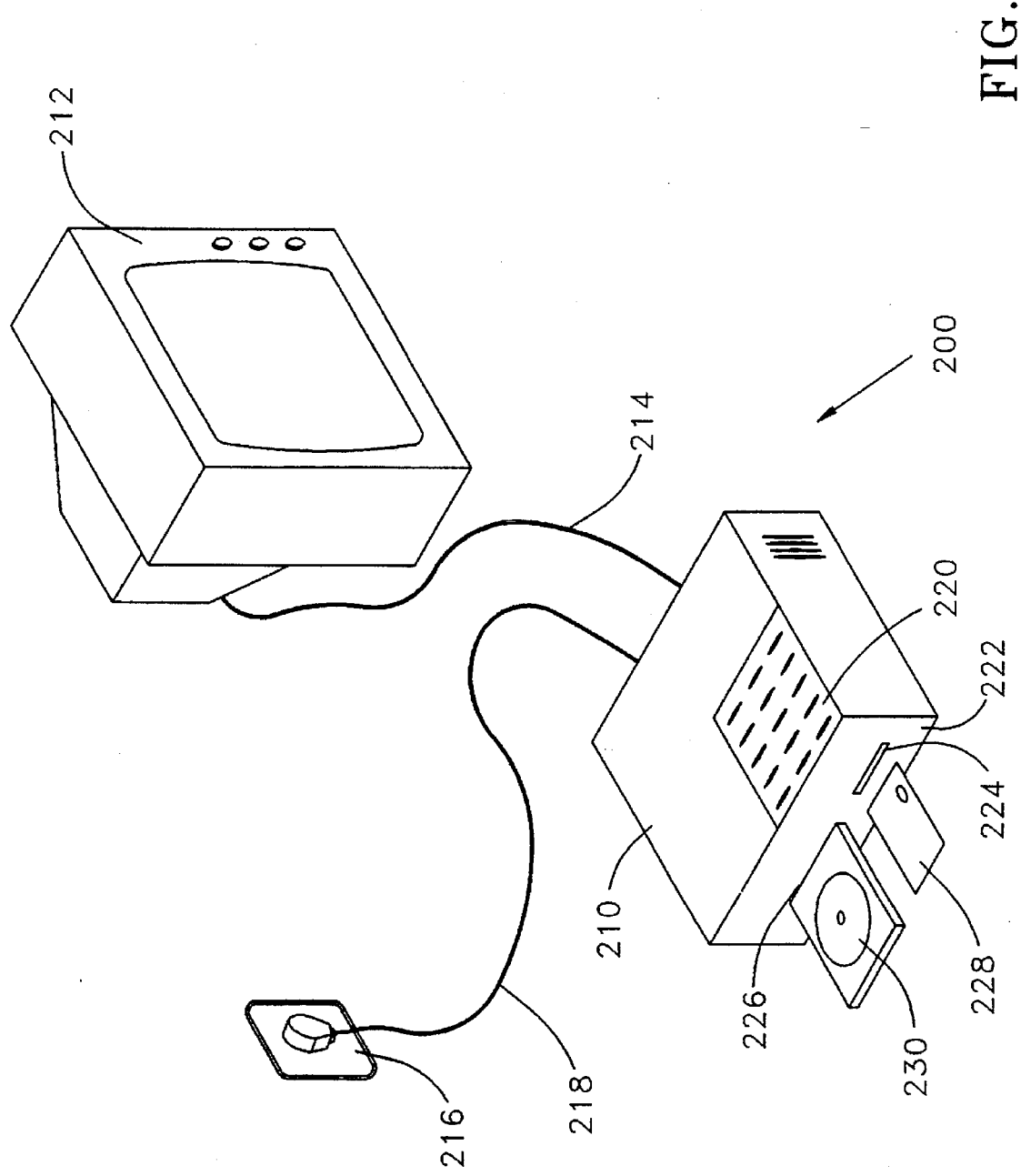
FIG. 6 is an illustration of a data access system constructed and operative in accordance with a preferred embodiment of the invention.

Reference is now made to FIG. 6 which is an illustration of a data access system constructed and operative in accordance with a preferred embodiment of the invention.

The access system of FIG. 6, generally denoted by reference numeral 200, may be employed to provide access to restricted information such as computer generated information, video games, CD-ROM data and data stored on magnetic disks. In a preferred embodiment of the invention the access system is operable with a CATV system.

In accordance with a preferred embodiment of the invention a CATV decoder 210 at a subscriber location is coupled to a television 212 via a coaxial cable 214. CATV decoder 210 is preferably fed from a CATV network (not shown) via a cable outlet 216 and a coaxial cable 218. CATV decoder 210 is preferably operated by a remote control (not shown) or a built-in keypad 220.

CATV decoder 210 includes, at a front panel 222, a card receptacle 224 and a CD-ROM unit having a receptacle 226. CATV decoder 210, incorporating the CD-ROM unit, is hereinafter described with reference to FIG. 7. Preferably, card receptacle 224 may accept a smart card 228. Alternatively, a magnetic card may be employed. In accordance with a preferred embodiment of the invention CATV decoder 210 is operative to decrypt CATV programs which are transmitted from a remote location, and games and data from a compact disk 230. The compact disk may preferably include games and data which are used in combination with data received from CATV transmissions.

It is to be appreciated that the CD-ROM unit may be replaced by an optical card unit, employing optical cards of the size of a credit-card, or a magnetic disk drive employing magnetic disks.

Figure 7:
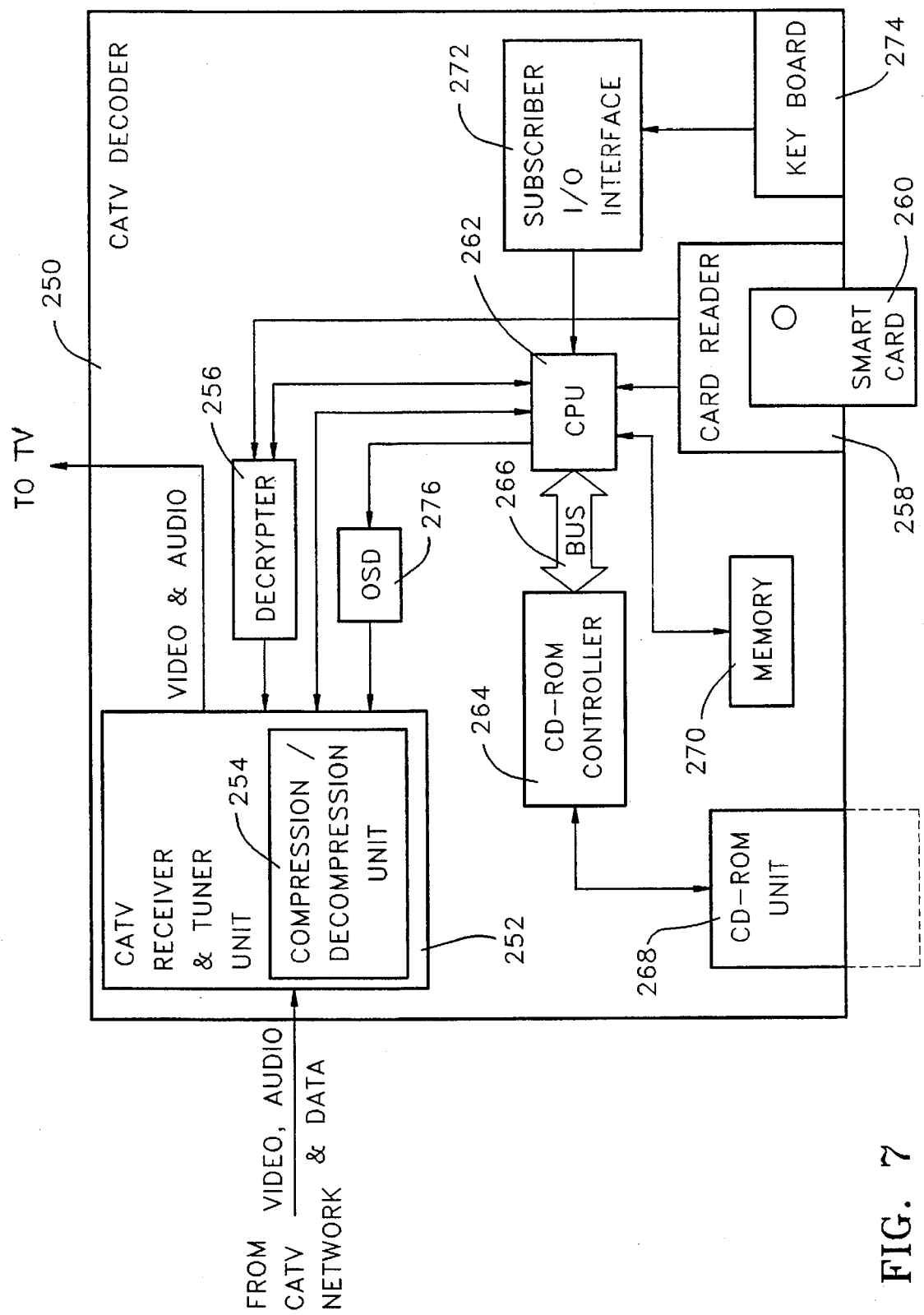
FIG. 7 is an illustration of part of the system of FIG. 6 constructed and operative in accordance with a preferred embodiment of the invention.

Reference is now made to FIG. 7 which is an illustration of a CATV decoder forming part of the system of FIG. 6, constructed and operative in accordance with a preferred embodiment of the invention.

Video, audio and data signals are provided by a CATV network (not shown) to a CATV receiver and tuner unit 252 in a CATV decoder 250. Preferably, CATV receiver and tuner unit 252 includes all circuitry required to provide video and audio signals in a format suitable for display on a television set. CATV receiver and tuner unit 252 may also include a compression/decompression unit 254 to decompress incoming compressed signals.

In a preferred embodiment of the invention a decrypter 256 is operable to decrypt encrypted transmissions prior to providing the video, audio and data signals to the television. Decrypter 256 is operative to receive any of seeds, keys and decryption algorithms from a smart card 260 via a smart card reader 258. Alternatively, decrypter 256 may receive seeds, keys and decryption algorithms via a CPU 262. CPU 262 is coupled to a CD-ROM controller 264 via a communication bus 266. CD-ROM controller 264 is coupled to a CD-ROM unit 268 and is operative to control the operation of CD-ROM unit 268 in accordance with instructions received from CPU 262.

Preferably, smart card 260 also provides any of seeds, keys and decryption algorithms for enabling access to data in a compact disk (not shown) mounted in CD-ROM unit 268. In that case CPU 262 receives any of the seeds, keys and decryption algorithms from smart card 260 via smart card reader 258, and applies decryption algorithms to data received from CD-ROM unit 268 via CD-ROM controller 264. CPU 262 is also coupled to a memory to store and retrieve data in accordance with instructions received from a subscriber, via a subscriber input/output interface 272. Subscriber input/output interface 272 is operable by the subscriber via keyboard 274 or a remote control (not shown). In a preferred embodiment of the invention CPU 262 may employ algorithms received from decrypter 256 and seeds or keys stored in memory 270 to decrypt the information received from the compact disk.

In the absence of smart card 260, or if an invalid card is present, the information received from the CATV network and the information received from the compact disk are not decrypted. Alternatively, separate entitlements may be provided to the subscriber, and CATV transmissions and compact disk data may be separately decrypted. It is to be appreciated that several levels of encryption may be employed so that the CATV transmissions have a higher level of security than the compact disk data, or vice versa.

In a preferred embodiment of the invention the data on the compact disk is not encrypted, but access is denied unless a key is applied to access files on the compact disk. Alternatively, access to the data on the compact disk may be denied or permitted by CPU 262 by controlling the operation of CD-ROM controller 264.

CPU 262 is also operative to provide information to be displayed on the television via an on-screen-display (OSD) 276. OSD 276 prepares the data received from CPU 262 in a format suitable for display on a television set and provides the data to a television via CATV receiver and tuner unit 252.

It is to be appreciated that the systems of FIGS. 6 and 7 may be operable in a stand-alone compact disk access system which is neither part of a CATV system nor coupled to a CATV system. Such a system may be a computer system in which access to a compact disk carrying data is required. In such a case the systems of FIGS. 6 and 7 may be degraded to a system in which smart card 260 enables access to data on a compact disk only via CPU 262, which may be part of the above mentioned computer system. To achieve this, the CATV receiver and tuner unit 252 in FIG. 7 may be omitted, the television 212 may be replaced by a simple computer monitor, the compression/decompression unit 254 may be omitted, if compression/decompression of data is not required, and the connection to cable outlet 216 may be omitted.

If, however, compression/decompression of data is required the compression/decompression unit 254 may remain as an independent unit which is not part of CATV receiver and tuner unit 252. In that case compression/decompression unit 254 may be either part of the computer system or a separate unit thereof, and all data from encryptor 256, CPU 262 and OSD 276 may be received directly at compression/decompression unit 254. Compression/decompression 254 will output data, including video data from a compact disk, to the computer monitor.

The case of stand-alone compact disk access system may be also captured as a special configuration of the systems of FIGS. 6 and 7 in which CATV transmissions are not present.

Figure 8:
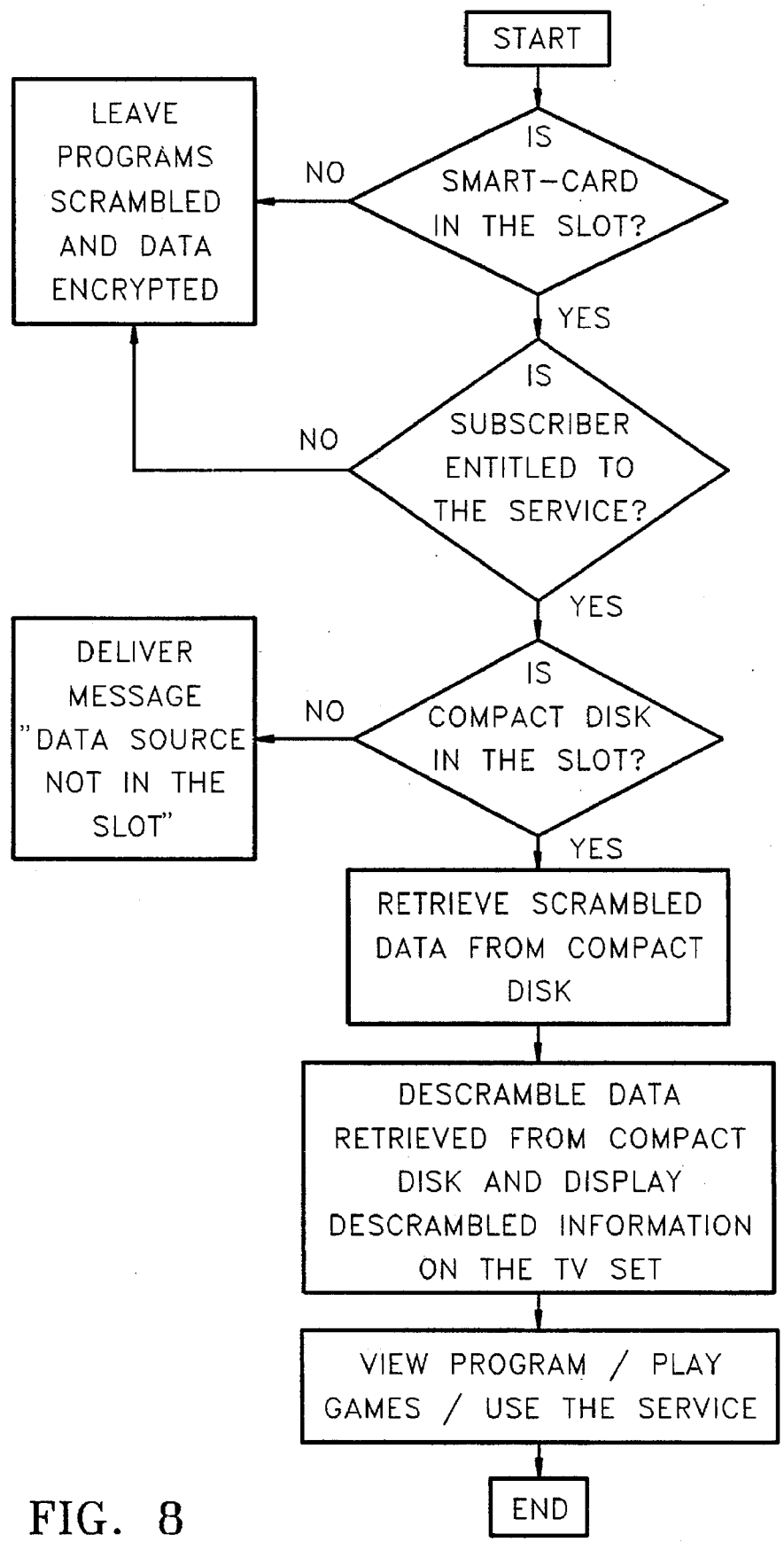
FIG. 8 is a flow chart illustration of the functionality of the apparatus of FIGS. 6 and 7 in accordance with a preferred embodiment of the invention.

Reference is now made to FIG. 8 which is a flow chart illustration of the functionality of the apparatus of FIGS. 6 and 7 in accordance with a preferred embodiment of the invention.

The CATV decoder of FIG. 7 may receive smart cards and any of CD-ROM, optical card and magnetic disk. A subscriber may enter selections via a remote control. If the subscriber does not insert his smart card into the card receptacle, programs and data transmitted via a CATV network remain scrambled. If the smart card is inserted in the card receptacle, the system checks if the subscriber is entitled to the selected service.

If the subscriber is not entitled to the selected service, transmissions and data regarding the selected service remain scrambled. If the subscriber is entitled to the selected service the system checks if the compact disk or the other data source is in the respective receptacle. If the data source is not in inserted in the receptacle, the system delivers a message "data source not in the slot". If the compact disk or data source is inserted in the card receptacle, the data is retrieved and decrypted and transmissions are descrambled so that the subscriber may make use of it.

It is to be appreciated that the systems of FIGS. 6 and 7 and the method described in FIG. 8 may be realized with one card only. In that case the data source may be part of a smart card, so that the smart card includes a memory which is large enough to store application data which may be used either with CATV transmissions or as stand-alone.

Such application data may include the storage of video data, such as video clips or significant events in sports or politics. Alternatively, pictures, voice data, important computer data and music clips may be stored in the smart card. In a preferred embodiment of the invention application data may be stored in a read-only memory (ROM) in the smart card. Alternatively, application data may be stored in a random-access memory (RAM) in the smart card. In that case the application data may be updated, periodically or upon request, via the CATV network.

In accordance with another preferred embodiment of the invention, a smart card may comprise two integrated circuits. In such a case all the above mentioned access control functions performed with two cards, i.e. parental control, billing and access to areas, are now performed with one card only which incorporates two integrated circuits. For the cases in which access to data is required one integrated circuit is employed for access control and security and the second integrated circuit is mainly employed for data storage. Data from the second integrated circuit is pulled upon authorization from the first integrated circuit. The advantage of such a configuration is that all communications between the two integrated circuits are performed inside the smart card so that hacking becomes more difficult.

It will be appreciated by persons skilled in the art that the present invention is not limited by what has been particularly shown and described hereinabove. Rather the scope of the present invention is defined only by the claims which follow:

We claim:

1. In a CATV system, wherein CATV programs are transmitted via a CATV network in encrypted form to a multiplicity of subscriber units each including a CATV decoder, and at least part of the CATV programs are rated for viewing under parental control, a CATV parental control system comprising:

a first IC card including at least one of decryption seeds, decryption keys and algorithms for decryption of programs which are not rated for viewing under parental control;

a second IC card including at least one of decryption seeds, decryption keys and algorithms for decryption of programs which are rated for viewing under parental control;

an IC card reader and writer coupled to said CATV decoder;

first and second IC card receptacles coupled to said IC card reader and writer, wherein said first and second IC cards communicate with said IC card reader and writer when inserted in the respected IC card receptacles; and a decrypter for decrypting said programs which are not rated for viewing under parental control in response to receiving said at least one of decryption seeds, decryption keys and algorithms for decryption from said first IC card, and for decrypting said programs which are rated for viewing under parental control in response to receiving said at least one of decryption seeds, decryption keys and algorithms for decryption from said first IC card and said at least one of decryption seeds, decryption keys and algorithms for decryption from said second IC card.

2. A CATV parental control system according to claim 1 and wherein said first IC card also includes a memory for storing billing data corresponding to viewing of programs which do not require parental control and of programs which require parental control.

3. A CATV parental control system according to claim 2 and also comprising storage means for maintaining separate accounts for programs which require parental control and for programs which do not require parental control in said first IC card.

4. A CATV parental control system according to claim 3 and also comprising a processor for providing separate identification codes to distinguish between programs which require parental control and programs which do not require parental control.

5. A CATV parental control system according to claim 1 and also comprising storage means for maintaining separate accounts for programs which require parental control and for programs which do not require parental control in said first IC card.

6. A CATV parental control system according to claim 5 and also comprising a processor for providing separate identification codes to distinguish between programs which require parental control and programs which do not require parental control.

7. A CATV system according to claim 1 and wherein said first IC card and said second IC card are interchangeable.

8. For use with a CATV system, wherein CATV programs are transmitted via a CATV network in encrypted form to a multiplicity of subscriber units each including a CATV decoder, and at least part of the CATV programs are rated for viewing under parental control, a method of exercising parental control comprising:

providing an IC card reader and writer coupled to said CATV decoder;

inserting a first IC card in a first IC card receptacle coupled to said CATV reader and writer;

addressing said first IC card via said CATV reader and writer to provide at least one of authentication, verification, validation and program entitlements of said first IC card;

enabling decryption of programs which do not require parental control in response to providing said at least one of authentication, verification, validation and program entitlements of said first IC card;

inserting a second IC card in a second IC card receptacle coupled to said CATV reader and writer;

verifying that said first IC card is in said first IC card receptacle;

addressing said second IC card via said CATV reader and writer to provide at least one of authentication, verification, validation and program entitlements of said second IC card; and enabling decryption of programs which require parental control in response to providing said at least one of authentication, verification, validation and program entitlements of said first IC card and of said second IC card.

9. A method of exercising parental control according to claim 8 and also comprising:

storing in said first IC card billing data corresponding to viewing of programs which do not require parental control and of programs which require parental control.

10. A method of exercising parental control according to claim 9 and also comprising:

maintaining separate accounts for programs which require parental control and for programs which do not require parental control in said first IC card.

11. A method of exercising parental control according to claim 10 and wherein said maintaining separate accounts comprises employing separate identification codes to distinguish between programs which require parental control and programs which do not require parental control.

12. A method of exercising parental control according to claim 8 and also comprising:

maintaining separate accounts for programs which require parental control and for programs which do not require parental control in said first IC card.

13. A method of exercising parental control according to claim 12 and wherein said maintaining separate accounts comprises employing separate identification codes to distinguish between programs which require parental control and programs which do not require parental control.

14. A method of exercising parental control according to claim 8 and wherein said first IC card and said second IC card are interchangeable.

15. In a CATV system wherein access to CATV transmissions is provided by a first IC card and by a second IC card which are insertable in two separate IC card receptacles in a CATV decoder, said first IC card being replaced at selected time periods, and wherein replaced cards are provided without valuable data stored therein, a card initialization system comprising:

a communicator for providing two way communication between said first IC card and said second IC card to enable at least one of authentication, verification and validation of said first IC card, wherein said first IC card and said second IC are simultaneously inserted in said two separate IC card receptacles.

16. A method for initializing a card in a CATV system wherein access to CATV transmissions is provided by a first IC card and by a second IC card which are insertable in two separate IC card receptacles in a CATV decoder, said first IC card being replaced at selected, time periods, and wherein replaced cards are provided without valuable data stored therein, the method comprising:

simultaneously inserting said first IC card and said second IC card in said two separate IC card receptacles; and providing two way communication between said first IC card and said second IC card to enable at least one of authentication, verification and validation of said first IC card.

17. An area access system comprising:

an identifier station including two separate card receptacles, wherein cards inserted into said two separate card receptacles are addressed by said identifier station;

an identification element including personal and official information, wherein at least part of the information is encrypted; and an application element including at least one of access keys, access seeds, and algorithms for enabling access to said information in said identification element, wherein said identification element and said application element are addressed by said identifier station to enable access to a restricted area in accordance with said information and said at least one of access keys, access seeds, and algorithms for enabling access to said information, and wherein at least one of said identification element and said application element includes security level data determining the level of encryption of said part of the information which is encrypted.

18. An area access system according to claim 17 wherein said information includes identification information of a bearer of said identification element.

19. An area access system according to claim 17 wherein said identification information includes a digitized picture of a bearer of said identification element.

20. An area access system according to claim 19 and also comprising a display for displaying said digitized picture of said bearer of said identification element.

21. An area access system according to claim 17 wherein said information includes information restricting access of a bearer of said identification element to a portion of said restricted area.

22. A method for accessing a restricted area comprising:

providing an identifier station including two separate card receptacles;

inserting an identification element including personal and official information in a first receptacle of said two separate card receptacles, wherein at least part of said information is encrypted;

inserting an application element including at least one of access keys, access seeds, and algorithms for enabling access to said information in said identification element in a second receptacle of said two separate card receptacles;

addressing said identification element; and addressing said application element, wherein said identification element and said application element are addressed via said identifier station to enable access to a restricted area in accordance with said information and said at least one of access keys, access seeds, and algorithms for enabling access to said information, and wherein at least one of said identification element and said application element includes security level data determining the level of encryption of said part of said information which is encrypted.

23. A data access system comprising:

a processor;

a memory card reader and writer, coupled to said processor, and including a memory card receptacle, wherein a memory card carrying encrypted information to be accessed is inserted into said memory card receptacle and addressed by said memory card reader and writer; and an IC card reader and writer, coupled to said processor, and including an IC card receptacle, wherein an IC card, inserted into said IC card receptacle and addressed by said IC card reader and writer, provides access codes to enable access to said information carried in said memory card, and wherein at least one of said memory card, said IC card, said memory card reader and writer and said IC card reader and writer includes security level data determining the level of encryption of said encrypted information.

24. A data access system according to claim 23 and wherein said access codes comprise at least one of seeds, keys and algorithms for decryption of said information.

25. A data access system comprising;

a CATV network; and apparatus for transmitting over said CATV network CATV transmissions to a multiplicity of subscriber units, each including:

a CATV decoder;

a memory device reader and writer, coupled to said CATV decoder, and including a memory device receptacle, wherein a memory device carrying information to be accessed which is inserted by a subscriber into said memory device receptacle is addressed by said memory device reader and writer; and an IC card reader and writer, coupled to said CATV decoder and to said memory device reader and writer, and including an IC card receptacle, wherein an IC card, inserted by said subscriber into said IC card receptacle and addressed by said IC card reader and writer, provides access codes having separate security levels which comprise separate decryption levels for enabling access to said information carried in said memory device and to said CATV transmissions.

26. A data access system according to claim 25 and wherein said access codes comprise at least one of seeds, keys and algorithms for decryption of said information.

27. A data access system according to claim 26 and wherein at least part of said information is encrypted and said CATV decoder includes security level data determining the level of security employed in encryption of said at least part of said information.

28. A data access system according to claim 25 and wherein at least part of said information is encrypted and at least one of said memory device, said IC card, said memory device reader and writer and said IC card reader and writer includes security level data determining the level of security employed in encryption of said at least part of said information.

29. A data access system according to claim 25 and wherein at least part of said information is encrypted and said data access system further includes a processor having security level data determining the level of security employed in encryption of said at least part of said information.

30. A data access system according to claim 25 and wherein at least part of said information is encrypted and said CATV decoder includes security level data determining the level of security employed in encryption of said at least part of said information.

31. A method for accessing data comprising:

providing a CATV network and apparatus for transmitting over said CATV network CATV transmissions to a multiplicity of subscriber units each including a CATV decoder coupled to a memory device reader and writer and to an IC card reader and writer, wherein said memory device reader and writer includes a memory device receptacle and said IC card reader and writer includes an IC card receptacle;

inserting a memory device carrying data to be accessed into said memory device receptacle and addressing said memory device via said memory device reader and writer;

inserting an IC card into said IC card receptacle, and addressing said IC card via said IC card reader and writer;

communicating access codes between said IC card and at least one of said IC card reader and writer, said memory device reader and writer, said CATV decoder and said memory device; and employing separate security levels having separate decryption levels for enabling access to said data carried in said memory device and to said CATV transmissions.

32. A data access system comprising:

a CATV network; and apparatus for transmitting over said CATV network CATV transmissions to a multiplicity of subscriber units, each including:

a CATV decoder;

a memory device reader and writer, coupled to said CATV decoder, and including a memory device receptacle, wherein a memory device carrying information to be accessed which is inserted by a subscriber into said memory device receptacle is addressed by said memory device reader and writer;

an IC card reader and writer, coupled to said CATV decoder and to said memory device reader and writer, and including an IC card receptacle, wherein an IC card, inserted by said subscriber into said IC card receptacle is addressed by said IC card reader and writer; and a processor coupled to said CATV decoder, to said memory device reader and writer and to said IC card reader and writer, wherein said processor includes access codes having separate security levels comprising separate decryption levels for enabling access to said information carried in said memory device and to said CATV transmissions.

33. A method for accessing data stored in a memory device comprising:

providing a processor coupled to a memory device reader and writer and to an IC card reader and writer, wherein said memory device reader and writer includes a memory device receptacle and said IC card reader and writer includes an IC card receptacle;

inserting a memory device carrying encrypted data to be accessed into said memory device receptacle and addressing said memory device via said memory device reader and writer;

inserting an IC card into said IC card receptacle, and addressing said IC card via said IC card reader and writer;

communicating at least one access code between said IC card and at least one of said IC card reader and writer, said memory device reader and writer, said processor and said memory device; and accessing said data carried in said memory device in accordance with security level data determining the level of encryption of said encrypted data and included in at least one of said memory device, said IC card, said memory device reader and writer and said IC card reader and writer.

34. A data access system comprising:

a processor;

a memory card reader and writer, coupled to said processor, and including a memory card receptacle, wherein a memory card carrying encrypted information to be accessed is inserted into said memory card receptacle and addressed by said memory card reader and writer; and an IC card reader and writer, coupled to said processor, and including an IC card receptacle, wherein an IC card, inserted into said IC card receptacle and addressed by said IC card reader and writer, provides at least one access code to enable access to said information carried in said memory card, and wherein said processor includes security level data determining the level of encryption of said information.

* * * * *